United States Patent
Calearo

[19]

[11] Patent Number: 6,100,852
[45] Date of Patent: *Aug. 8, 2000

[54] ANTI-THEFT ANTENNA

[76] Inventor: Massimo Calearo, Via Bacchiglione, 49 - 36033 Isola Vicentina (VI), Italy

[*] Notice: This patent is subject to a terminal disclaimer.

[21] Appl. No.: 09/140,897

[22] Filed: Aug. 25, 1998

[30] Foreign Application Priority Data

Aug. 11, 1998 [IT] Italy .................................. VI98A0153

[51] Int. Cl.[7] ...................................................... H01Q 1/32
[52] U.S. Cl. ........................ 343/715; 343/702; 343/900; 343/906
[58] Field of Search .................................. 343/715, 702, 343/900, 906; H01Q 1/32

[56] References Cited

U.S. PATENT DOCUMENTS

| | | | |
|---|---|---|---|
| 4,243,989 | 1/1981 | Piper | 343/715 |
| 4,266,227 | 5/1981 | Blaese | 343/715 |
| 5,032,846 | 7/1991 | Chang | 343/715 |
| 5,099,251 | 3/1992 | Fisher | 343/715 |
| 5,112,156 | 5/1992 | Boyer | 403/287 |
| 5,402,135 | 3/1995 | DeMarre et al. | 343/715 |
| 5,451,966 | 9/1995 | Du et al. | 343/715 |
| 5,603,630 | 2/1997 | Villain | 439/347 |
| 5,661,497 | 8/1997 | Calearo | 343/715 |
| 5,926,138 | 7/1999 | Eerikainen | 343/702 |

FOREIGN PATENT DOCUMENTS

| | | |
|---|---|---|
| 0 443 172 A1 | 8/1991 | European Pat. Off. . |
| 0 701 295 A1 | 3/1996 | European Pat. Off. . |
| 2478379 | 9/1981 | France . |
| 2708594 | 8/1978 | Germany . |
| 87 03 563 | 7/1987 | Germany . |
| 2 165 298A | 4/1986 | United Kingdom . |
| 2 308 013 | 6/1997 | United Kingdom . |
| 96/13074 | 5/1996 | WIPO . |

*Primary Examiner*—Don Wong
*Assistant Examiner*—Huang Nguyen
*Attorney, Agent, or Firm*—Watson Cole Grindle Watson, P.L.L.C.

[57] ABSTRACT

An car antenna having anti-theft features including a rod for receiving radio-frequency signals; a support base to be secured to a support surface; and a joint secured in the base. The rod or the joint includes an elastic element for allowing the base and joint to be unidirectionally coupled and snapped together. The joint may also include articulating portions allowing the antenna position to be adjusted.

22 Claims, 9 Drawing Sheets

ANTI-THEFT ANTENNA

BACKGROUND OF THE INVENTION

The invention is directed to an antenna particularly suited for use on a motor vehicle.

Antennas for motor vehicles generally include a base secured to the body of the car and a rod that comprises the active element of the antenna.

In known applications, the rod of the antenna can be fixed or oriented with respect to the base and it may be connected to the base itself by a removable connection, for example, screws, pins and the like.

One of the drawbacks of known antennas is that unauthorized persons can readily remove the antenna from the support with appropriate tools which are easily acquired.

The present invention seeks to eliminate or deter this disadvantage. In particular, one aim of the invention is to provide an antenna suitable for installation on a motor vehicle that would have anti-theft features, and particulary features for preventing the removal of the rod from the support base.

Another aim of the invention is to provide an antenna with such anti-theft features, both on an arrangement having a fixed rod or an adjustable rod.

SUMMARY OF THE INVENTION

These purposes have been achieved through the orientation of an antenna particulary suitable for installation on motor vehicles which comprises an antenna rod suitable for receiving radio frequency signals which may be secured to a support base by a suitable connection. The connection comprises a joint having an elastically deformable terminal element which may be in unidirectionally inserted and snapped into the respective housing.

According to an exemplary embodiment, the terminal element comprises a terminal body having a clutch head and at least a slanting surface which allows elastic deformation of the terminal element as it is inserted into a hole in the housing and which is smaller than the maximum size of the clutch head when undeformed.

In order to facilitate the elastic deformation of the terminal element, the clutch head and at least a portion of the terminal body have one or more through notches which extend longitudinally of the terminal element. The notches allow the terminal element to deform inwardly as it is inserted into the hole.

In another embodiment, the clutch head extends radially outwardly of the terminal element and is compressed inwardly during insertion.

In yet another embodiment of the invention, the terminal element passes through a hole which is formed with deformable material which allows one way insertion of the antenna rod into the base.

BRIEF DESCRIPTION OF THE DRAWINGS

The aforementioned purposes and others will be further described in the following description, with reference to the attached drawings, wherein.

DESCRIPTION OF THE INVENTION

The first exemplary embodiment of the invention is described showing an automobile antenna 1 having a fixed rod 2 a housing 4 and a joint element with anti-theft features secured to a base 3 as hereinafter described. The invention may be extended to embodiments in which the rod may be oriented with respect to the base to which it is connected. The antenna 1 is adapted to be fixedly secured to a supporting surface 5, for instance, the body of a car (not shown).

Figures 1, 2:
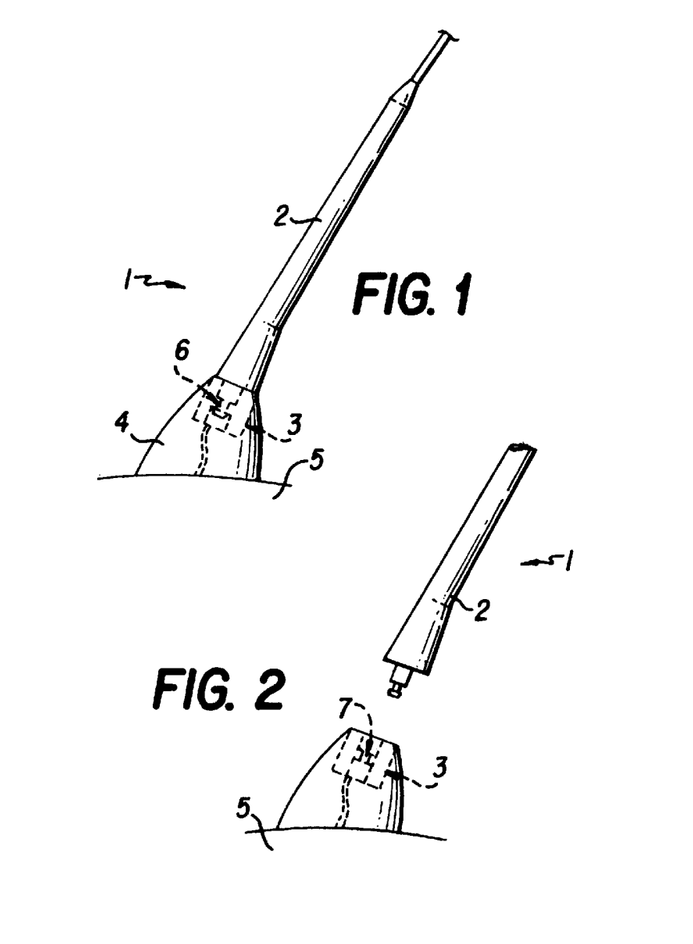
FIG. 1 shows the antenna according to the invention.
FIG. 2 shows the antenna of FIG. 1 in an exploded view.
Figure 3:
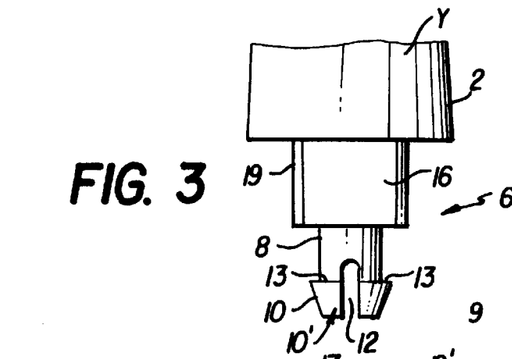
FIG. 3 shows a fragmentary detail of the elastic terminal element of the antenna rod.
Figure 4:
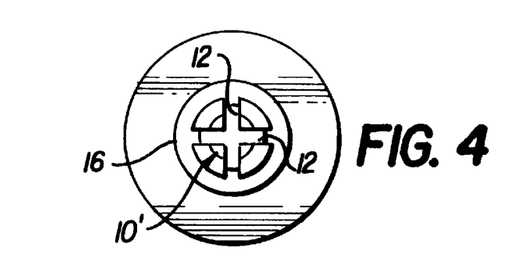
FIG. 4 is a plan view of the arrangement of FIG. 3.
Figure 5:
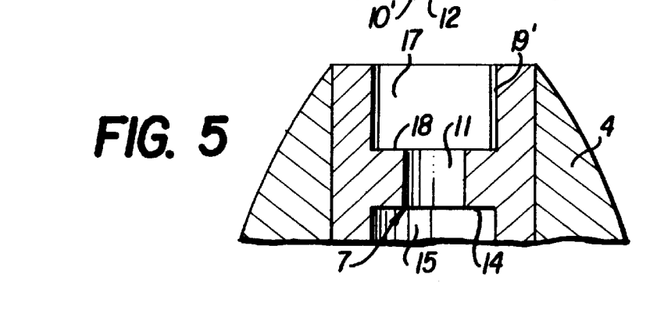
FIG. 5 is a longitudinal section of the joint element of the antenna for receiving the elastic terminal element shown in FIG. 3.

A particular feature of the invention comprises an elastic terminal element 6 suitable for unidirectional insertion, by a snap fit, into a stepped axial opening 7 of the housing 4. In particular, as can be seen in FIGS. 3–5, the elastic terminal element 6 extends from the rod 2 and comprises a terminal body 8 with a clutch head 9 at the free end. The stepped axial opening 7 in the housing has a first central opening 11 with a stepped wall as shown defining holes 15 and 17. The clutch body 9 is insertable into the hole 11 and has a slanting surface 10 that allows elastic distortion or deformation of the terminal element 6 as the clutch head 9 is inserted into the housing 4 and passes through the hole 11. The clutch head 9 is wider than the hole and has axial notches 12 formed therein as shown. The clutch head is made of a material which is flexible and the notches 12 allow the flexible material to deform as it is inserted into and clears the hole 11. In the exemplary embodiment, four notches 12 are provided which allow the clutch head to be deformed inwardly and thereby produce a snap fit with the base as the terminal end 6 is inserted into the hole 11. See for example FIGS. 6 and 7 which shows the deformation of the clutch head as is inserted into the hole 11 and snap fit recovery of the clutch head as it clears the hole.

Figure 6:
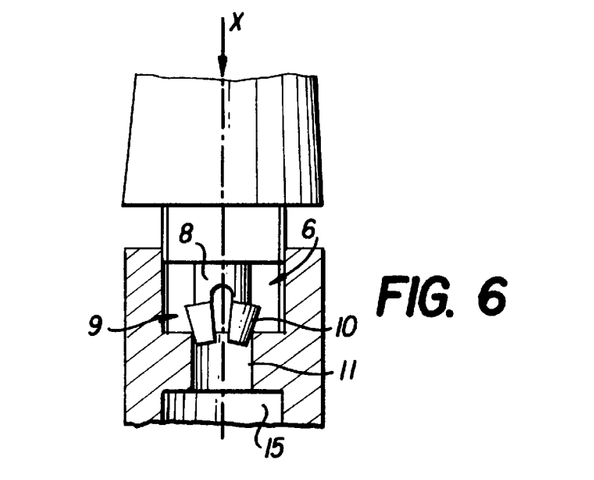
FIG. 6 is a fragmentary view of the elastic terminal element of FIG. 3 and the joint element of FIG. 5 during mutual coupling.
Figure 7:
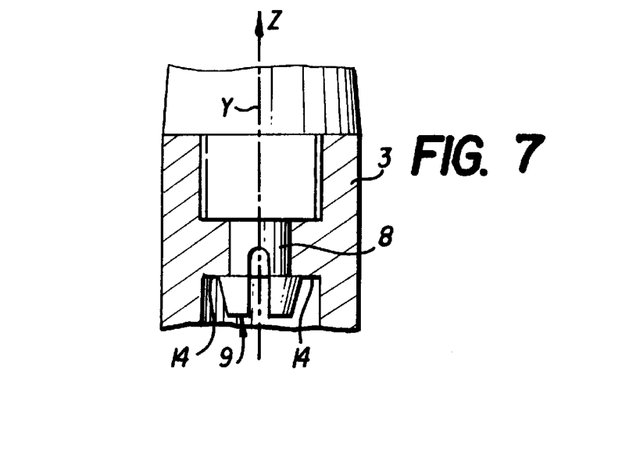
FIG. 7 is similar to FIG. 6 after the coupling has been achieved.

It can be observed that the clutch head 9 has protruding portions that define at least one flat outwardly projecting rear facing surface 13 suitable for engaging a corresponding forward facing back draft surface 14 formed in the housing 7. The back draft surface 14 is formed in the enlarged stepped portion forming second hole 15 located beyond or downstream of the hole 11 and coaxially therewith. The second hole 15 allows the clutch head to expand when the terminal element extends through and clears the first hole 11. In particular, as can be seen in FIGS. 6 and 7 when the rod 2 is axially pushed in the x direction (FIG. 6) towards the joint element 3, the slanting surface 10 over the clutch head 9 bears against the first hole and producing inward radially deformation of the clutch head. As the clutch head passes through the first hole and when the surface 13 reaches the second hole 15, the clutch head 9 expands because of the elastic spring back of the material and snaps into a locked position. In this way the terminal element 6 returns to the undeformed configuration shown in FIGS. 3 and 7 as it was before the coupling operation. In this way, the flat projecting surface 13 of the clutch head 9 engages and bears against the back draft surface 14 in confronting contact, so that the separation of the terminal element 6 from the joint element by reverse force in the z direction is prevented except by destroying the clutch head. In this way a firm and stable coupling between the rod 2 and the joint element 3 is achieved. The coupling results in an antenna having anti-theft features.

It can be seen that the terminal element 6 is also coaxial with the end of a centering body 16 formed in the rod to thus engage a corresponding stepped wall portion or centering seat formed in the third hole 17 formed upstream of the opening 11 as shown. The rod is coaxially centered in the opening 11 by means of the centering body 16 and third hole 17. The centering seat is also coaxial with and aligned with the first hole of the housing and has a larger perimeter to thereby define a shoulder 18 for receiving the centering body 16 thereagainst. The centering body 16 and the respective third hole of centering seat 17 have corresponding threaded parts 19, 19' for effecting mutual coupling. In the arrangement illustrated, the centering body 16 and the terminal body 8, as well as the respective holes in which they are engaged, have a circular profile. The slanting surface 10 of the clutch head 9 has a curved surface in the form of a truncated cone as shown. When the threads 19, 19' engage, the body is twisted thereby forcing the rod in the x direction to couple the parts.

Figure 8:
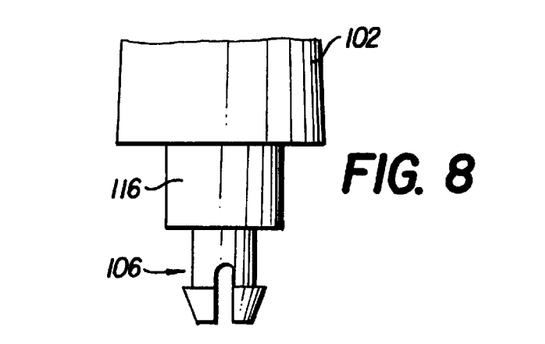
FIGS. 8, 9, & 10 illustrate another embodiment of the invention in which coupling is achieved without a threaded member.
Figure 9:
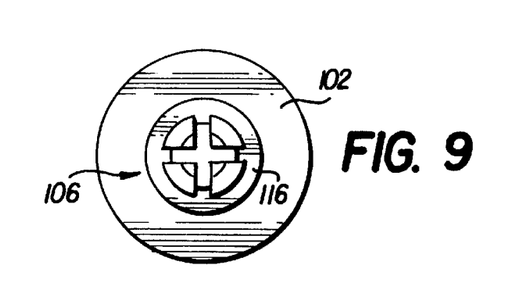
Figure 10:
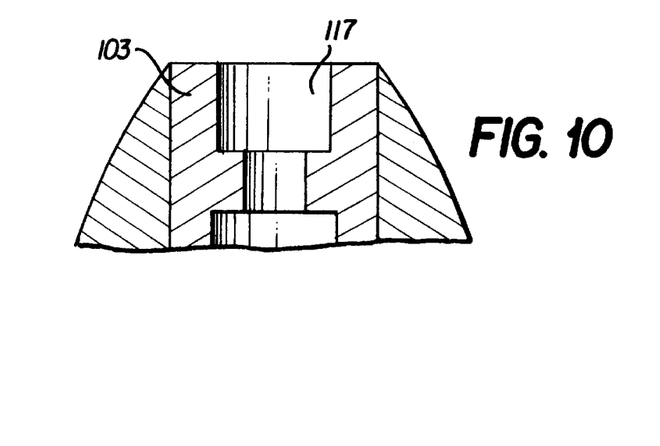

Another exemplary embodiment is shown in FIGS. 8–10 and employs a different terminal element 106 which extends from the rod 102. The terminal element 106 is fixed to the end of the centering body 116. The arrangement has a circular profile and coupling is achieved by sliding the centering body 116 into the centering seat 117. In the arrangement of FIGS. 8–10 the centering body 116 and the centering seat 117 are not threaded.

Figure 11:
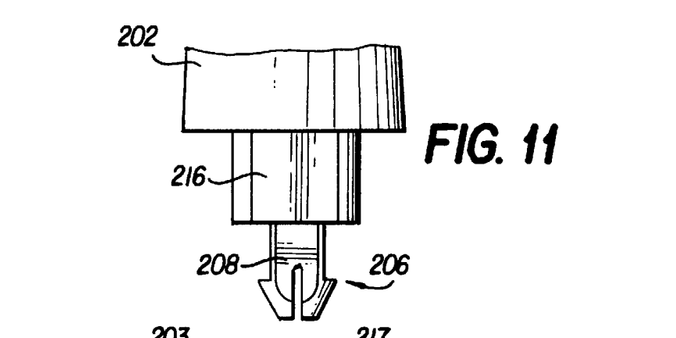
FIGS. 11, 12, & 13 illustrate another embodiment of the invention with a keyed terminal element and hole.
Figure 12:
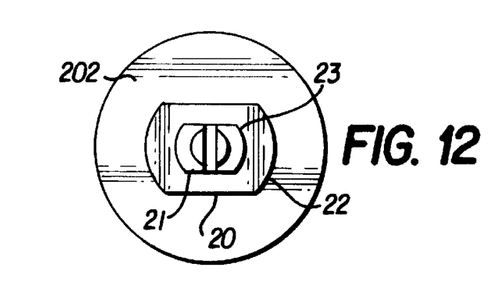
Figure 13:
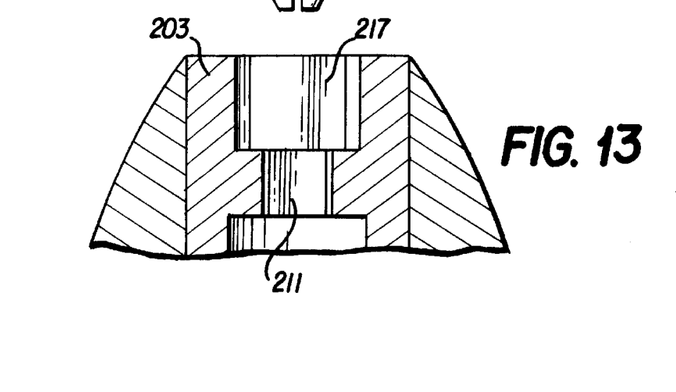

In yet another embodiment of the invention shown in FIGS. 11–13, the terminal element 206 of the rod 202 is fixed to the end of a centering body 216. In the arrangement shown, the terminal element 206 and the centering body 216 have transverse profiles formed by parallel surfaces 20 and 21 connected by corresponding curved profiles 22 and 23 respectively.

The respective centering seats 217 and the first hole 211 of the joint element 203 have corresponding flat and curved surfaces suitable for defining conjugate or keyed profiles. In other words, the hole 211 and centering seat 217 have profiles which mate with the terminal element 206 and centering body 216 respectively. The mating parts do not rotate with respect to each other.

Figure 14:
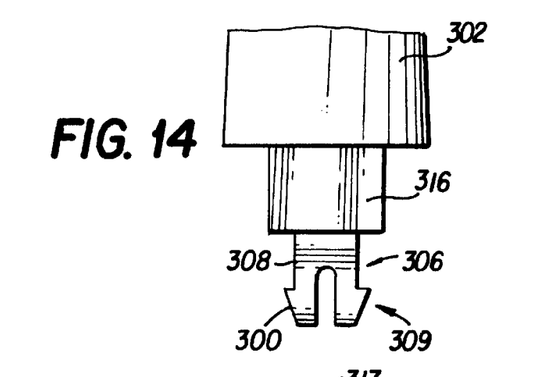
FIGS. 14, 15, & 16 illustrate another embodiment of the invention with a to rectangular key.
Figure 15:
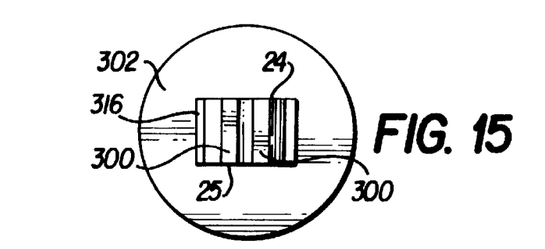
Figure 16:
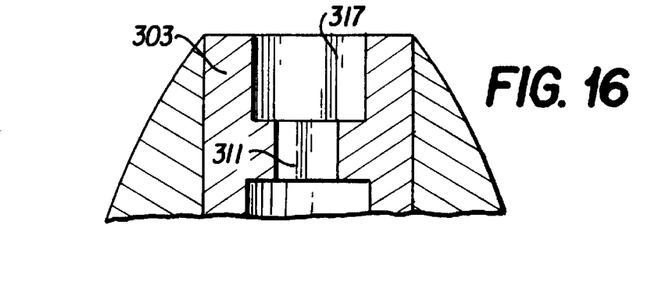

In another embodiment shown in FIGS. 14–16, the terminal element 306 of the rod have rectangular transverse profiles 24 and 25 respectively. The first hole 311, and the centering seat 317 of the joint element 303 have corresponding conjugate or keyed profiles to allow the mating of the parts. The clutch head 309 has flat slanting surfaces 300 as shown in FIGS. 14 and 15. The mating parts do not rotate with respect to each other.

Figure 17:
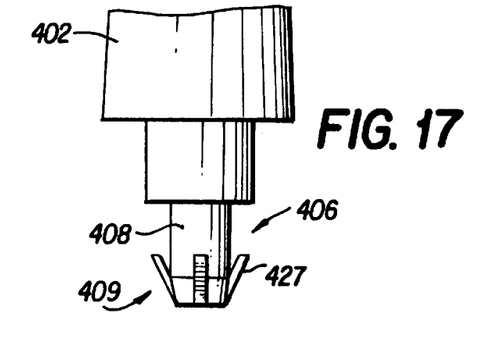
FIGS. 17, 18, & 19 is yet another embodiment of the invention with a terminal element having flexible, radial locking fins.
Figure 18:
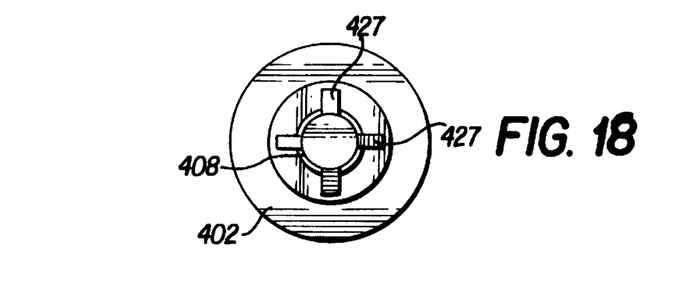
Figure 19:
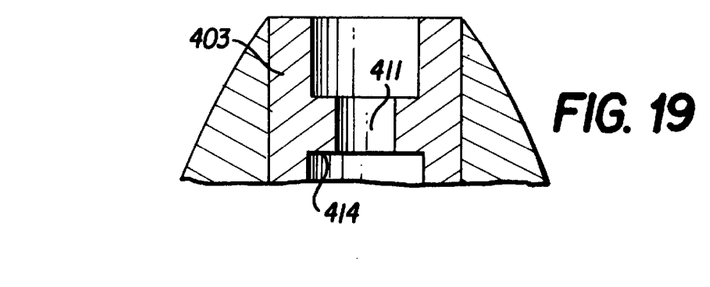

According to yet another exemplary embodiment of the invention shown in FIGS. 17–19, the terminal element 406 of the rod 402 has a clutch head 409 with elastic fins 427 which project radially from the terminal body 408. In the arrangement shown, the transverse dimension of the first hole 411 of the joint element 403 allows passage of the terminal body and the fins 427 therethrough. When the terminal element 406 is inserted into the opening 411, the fins become deformed allowing the clutch head to pass through the hole 411. When the fins clear the hole, they snap outwardly and engage to the back draft surface 414.

Figure 20:
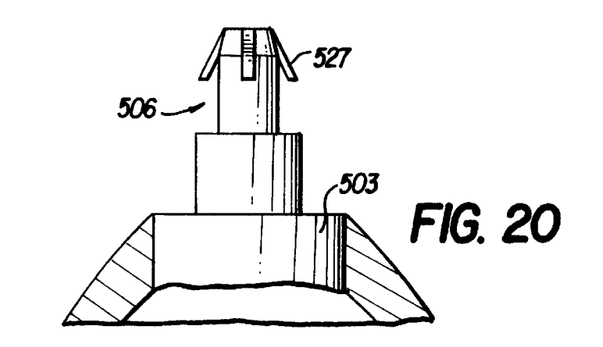
FIGS. 20, 21, & 22 is another exemplary embodiment of the invention with a terminal element secured to the base having flexible, radial locking fins similar to the arrangement of FIGS. 17–19.
Figure 21:
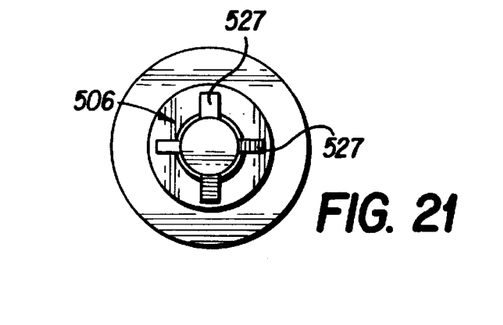
Figure 22:
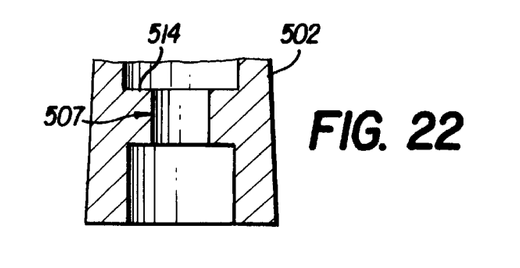

In another embodiment of the invention as illustrated in FIGS. 20–22 which is similar to the arrangement of FIGS. 17–19 except that the parts are reversed, that is, the terminal element 506 is formed in and extends from the joint element 506 and a housing 507 is formed in the terminal end of the rod 502. In the arrangement shown, the terminal element 506 has radial fins 527 which are deformed as the rod 502 engages the terminal element 506 which passes through the hole 507 and engage back draft surface 514, as shown. In each of the embodiments illustrated in FIGS. 17–18 and 20–22 a centering body 416 and 516 as the case may be, engages the centering hole or seat 417 and 517 for each corresponding embodiment.

In each of the various embodiments the elastic terminal element is formed in the joint element (or the rod). The receiving housing is formed in the rod (or joint element) as the case may be.

Figures 23, 24:
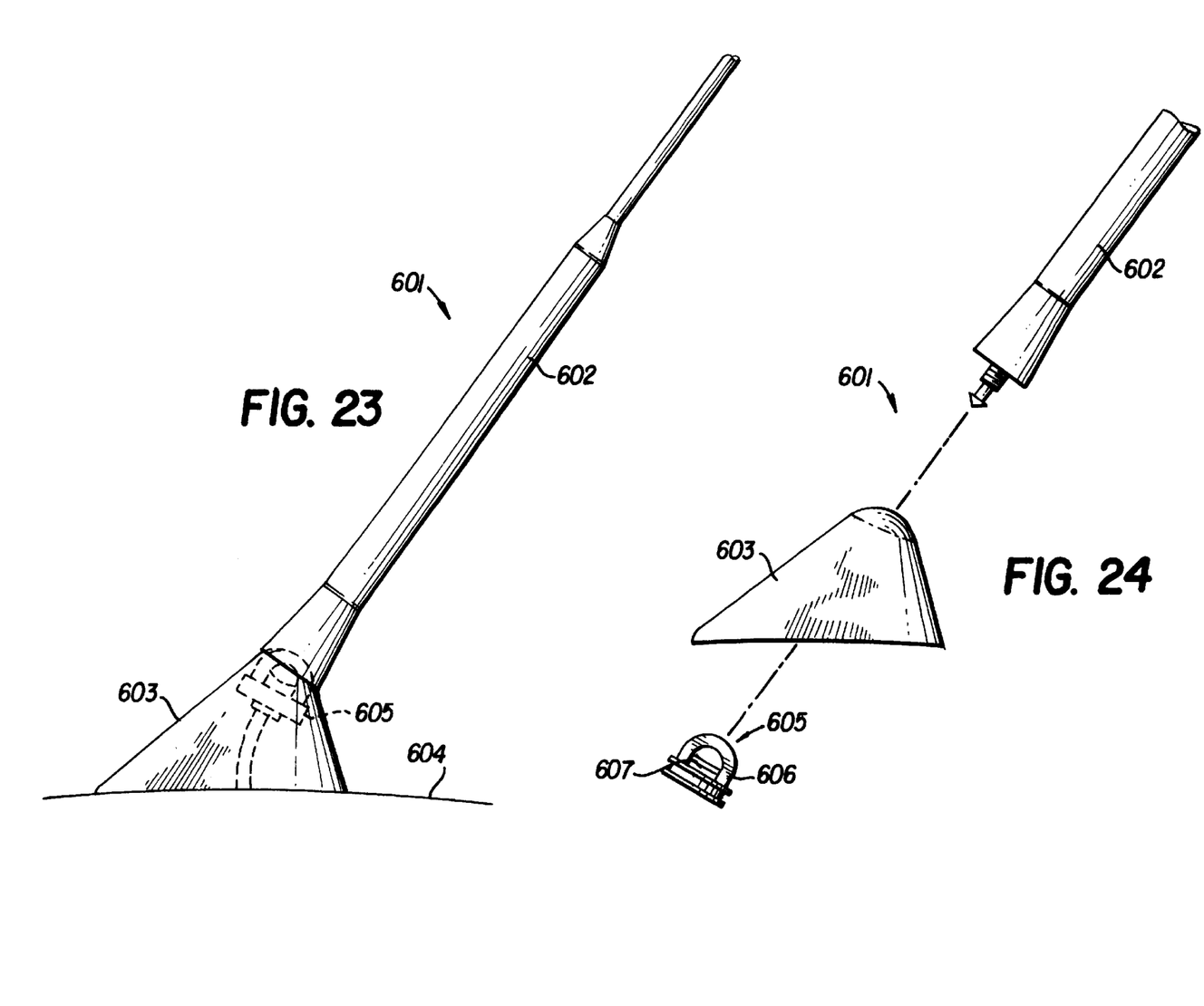
FIG. 23 illustrates another embodiment of the antenna according to the invention with an adjustable antenna mast or rod.
FIG. 24 is an exploded view of the arrangement of FIG. 23 showing a supporting base, a rod, and a ball and socket joint for the antenna.

In yet another embodiment shown in FIG. 23, the antenna 601 of the invention comprises a rod 602 connected to a supporting base 603 secured to a supporting surface, for example, a car (not shown). The joint element 605 is a ball and socket joint which allows the rod or mass 602 of the antenna 601 to be oriented.

The antenna 601 has a ball and socket joint 605 shown generally in FIG. 23 and in greater detail in FIG. 24. The ball and socket joint 605 comprises a first ball and socket joint element 606 secured to the base 603 which collaborates with the second ball and socket joint element 607 which is secured to the rod 602.

The first ball and socket joint element 606 comprises a body 662 which is applied to the base 603 (FIG. 24) by means of an annular area 661 arranged at the lower extremity of the body 606. The annular area snap couples with a corresponding annular recess 631 formed in the base 603 of the antenna 601. See for examples FIGS. 23 and 30.

Figure 25:
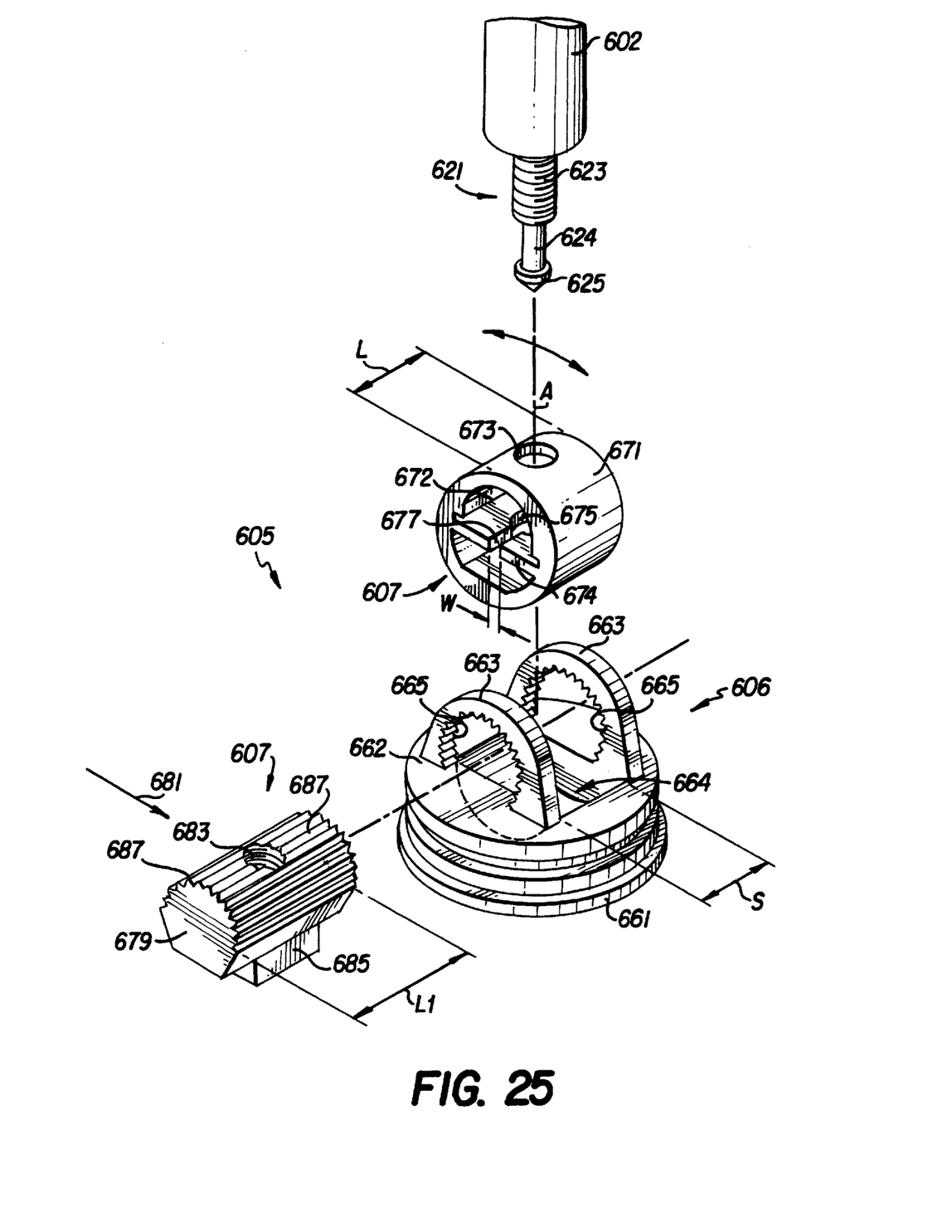
FIG. 25 is an exploded detail view of the ball and socket arrangement shown in FIG. 24.

The first ball and socket joint element 606 is formed of a conductive material and includes a pair of coaxial spaced apart upstanding rings 663 having inner tooth elements 665 formed therein. The rings 663 are integral with the body 662. The body 662 also includes a recessed portion 664 which is a portion of a cylinder coaxial with the rings 663 as shown in FIG. 25.

The second ball and socket joint element 607 comprises an insulating reel 671 having a circular profile. The reel 671 in the form of a generally annular member having a deformable or seat 672 formed therein. The reel 671 is also formed with a first hole 673 in the outer portion thereof. In the arrangement illustrated, the seat 672 comprises elastic web or plate 674 having through hole 675 and notch 677 which renders the web 674 deformable. The insulating reel 671 has an axial length L which is equal to the axial spacing S between the rings 663 so that the insulating reel 671 may be secured in the housing 664 therebetween. The first hole 173 in insulating reel 671 is diametrically aligned with the hole 675 in the web 674.

The arrangement also includes a toothed element 679 formed of conductive material and having an upper surface with a circular profile as shown. The upper surface of the toothed element 679 has tooth elements 681 formed therein and adapted to be inserted coaxially of the rings 673 so that the toothed surface 681 engages the corresponding tooth elements 665 of the rings 663 as shown. As a result, the conducing element 679 is adapted to engage the body 662 in a conductive contacting relationship.

In the arrangement illustrated the tooth element 679 is adapted to the move reciprocally within the openings defined by the ring 663 and also to move rotatably to therein. As a result, the tooth element 679 may be rotated to any selected position and then moved radially outwardly so that the teeth 665 and 681 mutually engage, and this way the tooth element 679 may be positioned to a variety of rotational positions.

The tooth element 679 further includes a threaded opening 683 which is adapted to the aligned diametrically with the openings 673 and 675 in the reel 671 as hereinafter described.

The tooth element 679 has a central web portion 685 formed with a notch 687 which is centrally aligned with the opening 683 and has a length L1 as shown. The web 685 has a width W which corresponds with the width of the notch 677.

In accordance with the invention, the tooth element 679 is adapted to slide within the reel 671 with the web 685 engaging or sliding within the notch 685 that the threaded opening 683 therein is in alignment with the holes and hole 673 and 675 as shown. In the arrangement illustrated, the reel 671 is located in the body 662 between the upstanding rings 663 and the conductive toothed element 679 is inserted into rings 663 and the reel 671. Extreme ends 687 of the toothed element 679 extend beyond the reel 671 a sufficient distance so that the toothed element 679 may engage the teeth 665 in the rings 663. As a result, the reel 671 and the conductive toothed element 679 cooperate with the body 662 so that the reel may be rotatably positioned within the rings 663 with the various openings 683, 675 and 679 in alignment and forming a mast axis A which is positionable to a variety of orientations.

Figures 26, 27, 28, 29:
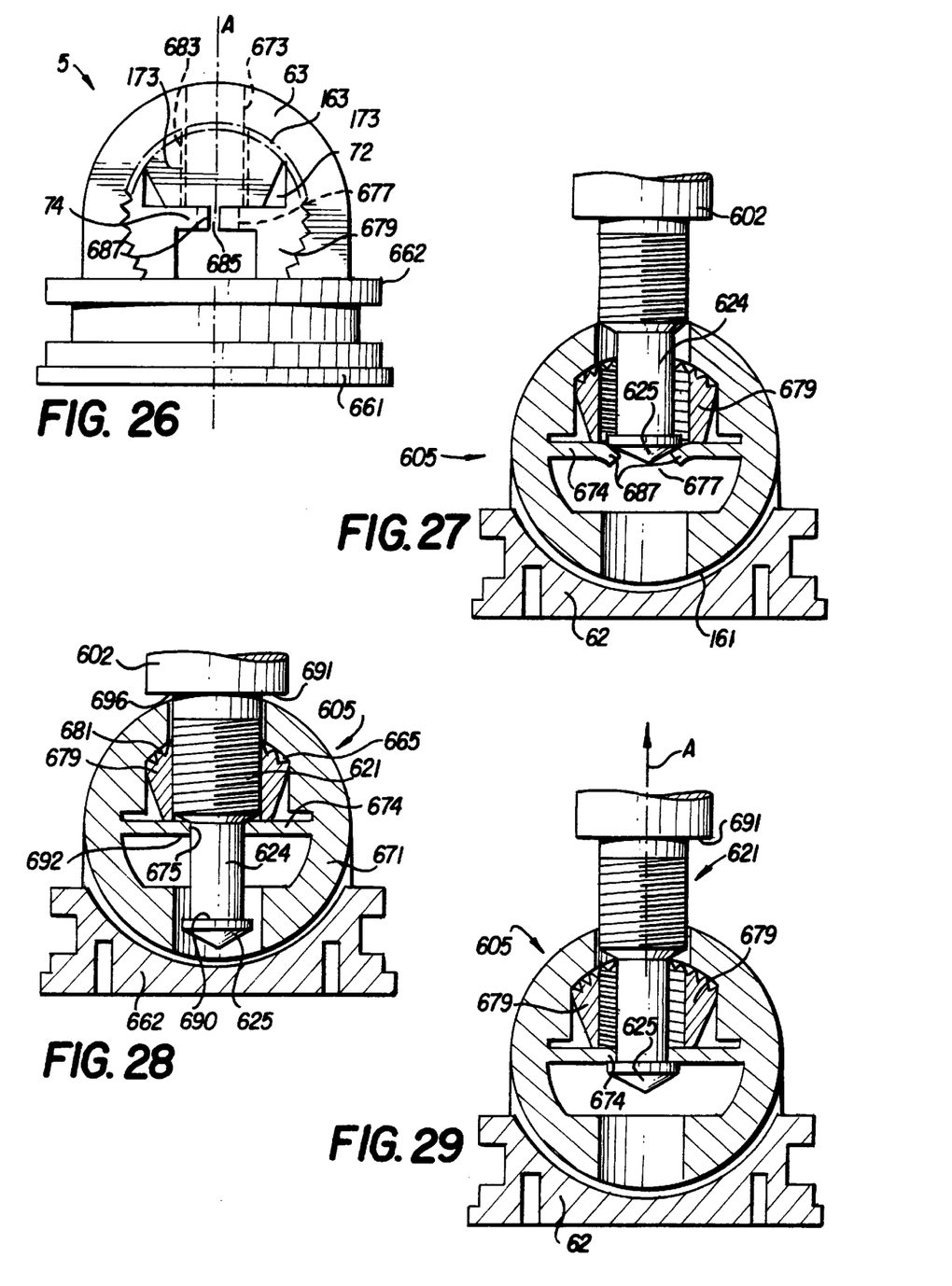
FIG. 26 is a front view of a ball and socket joint as assembled.
FIG. 27 is a cut away view of the ball and socket joint of FIG. 26 showing insertion of the rod into the base during assembly.
FIG. 28 shows a cut away view of the ball and socket joint shown in FIG. 27 once assembly has been completed.
FIG. 29 illustrates the anti-theft feature of the ball and socket joint of FIG. 28.

The rod 602 has a terminal end 621 which may be unidirectionally inserted into the hole 675 via the first hole 673. The terminal element 621 comprises a substantially cylindrical body along the longitudinal axis of the rod and having a threaded centering body 623 therein proximate the distal end of the rod 602. The terminal element 621 has a non threaded area 624 of reduced diameter positioned between the threaded area 623 and a conical terminal end 625 which maybe similar to the various notched or fined clutch head elements described hereinabove or may be solid as shown.

The toothed element 679 secured in the reel 671 receives the conical portion 625 of the terminal element 621 therein along with the unthreaded portion 624 via the web 674. As can be seen in FIG. 27, the openings 673 and 683 are larger than the conical parts 625 and the opening 677 of the web 674 is smaller than the diameter of the conical terminal element 625. As a result, the conical element freely passes through holes 673 and 683 and forceably engages the hole 675. As a result, when the end 625 of terminal element 621 is inserted into the reel 671 along the axis A, the conical end 625 deforms the inner portions 687 of the web 674 (FIG. 27). When the conical element 625 clears the opening 675, the end portions 687 of the hole 675 elastically recover and engage the unthreaded region 624 of reduced diameter 624 of the terminal element 621 as shown in FIG. 28. The conical element 625 has a rearwardly facing surface 690 which is adapted to engage the lower or back draft surface 674 of the web which prevents removal of the antenna rod 602. (See for example FIG. 28).

Once the terminal element 621 is inserted in the hole 673 and clears the hole 675, the antenna 602 may be moved inwardly so that the threaded portion 623 of the terminal element 621 engages the threads 683 in the toothed element 679. As the rod 602 is fully threaded into the opening 683 a forward surface 691 engages an upper portion 696 of the reel 671 causing the teeth 681 of the toothed element 673 to engage the teeth 665 in the rings 663 to thereby lock the rod 602, reel 671 and toothed element 679 in fixed position with respect to the base.

Figures 30, 31, 32:
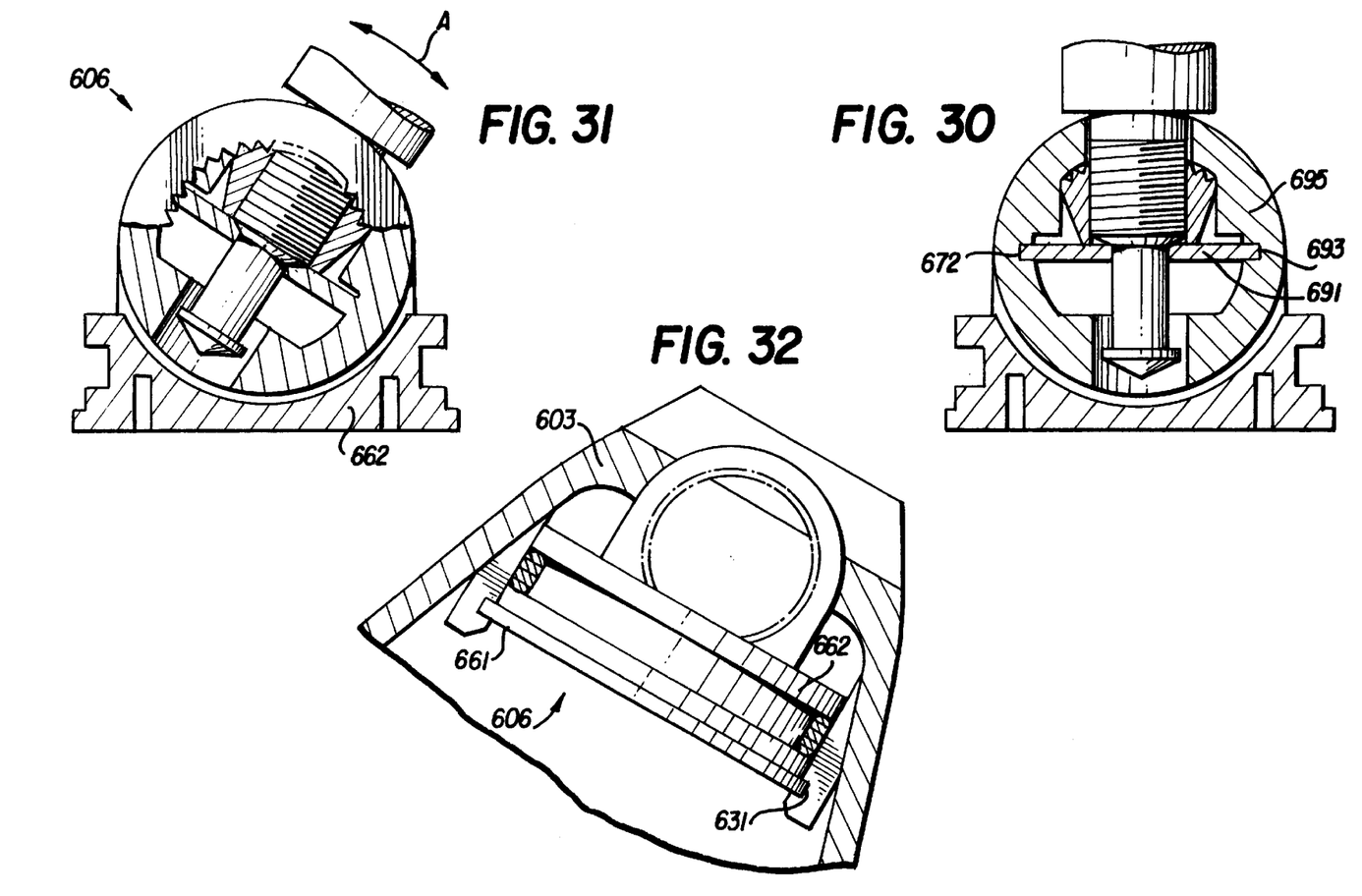
FIG. 30 illustrates the adjustable orientation feature of the ball and socket joint of FIG. 28 with a modified web and reel.
FIG. 31 illustrates a detail of the articulating connection of the ball and socket joint of the invention.
FIG. 32 illustrates an arrangement for securing the base to the housing.

If it is desired to adjust the angular position of the axis A, the rod 602 may be unthreaded as shown in FIG. 31 so that the toothed element 679 is released to move reciprocally away from the rings 663 so that the teeth disengage. The rod may then be positioned to another orientation and threaded forwardly so as to draw the tooth element against the teeth of the rings and thereby lock the antenna in the desired orientation.

Figure 33:
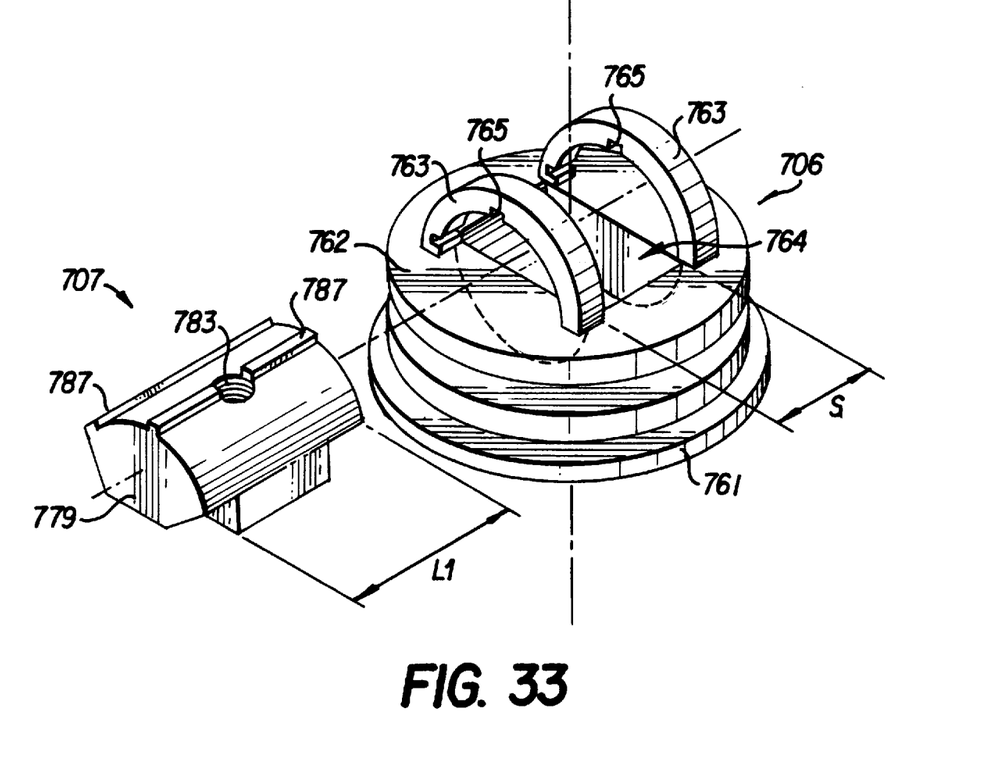
FIG. 33 illustrates another embodiment of the adjustable ball and socket joint of the invention.

In FIG. 30 the web 691 is a separate part slidable in a notch 693 of reel 695. In FIG. 33 the rings 763 have notches 765 adapted to engage detents 781 in conductive member 779 providing another embodiment of an adjustable antenna with anti-theft features.

Further details of the above arrangements are illustrated and described in U.S. Pat. No. 5,661,479 which issued Aug. 26, 1997, the teachings of which are incorporated herein by reference.

While there have been described what are considered to be exemplary embodiments of the invention, it will be apparent to those skilled in the art that various changes and modifications may be made therein without departing from the invention. It is intended in the attached claims to cover such changes and modifications as fall within the true spirit and scope of the invention.

I claim:

1. An antenna comprising a rod for receiving radio frequency signals and a support base having a surface adapted to be secured to a support surface, a joint element secured within said support base for supporting said rod, said joint element having a first hole formed therein, said rod including an elongated elastic terminal element having a longitudinal axis adapted to be unidirectionally inserted and snapped into said first hole, said terminal element including a terminal body having a free end, an elastically deformable clutch head being formed at said free end and including a slanting surface allowing deformation of said terminal element during passage through the first hole, said first hole having a smaller cross-section than the maximum cross-section of the undeformed clutch head, said clutch head being formed with a notch extending along said longitudinal axis providing deformability to said clutch head, said clutch head having an outer perimeter and a flat rear facing surface being disposed between said outer perimeter and said terminal body, said joint element having formed therein a second hole of greater cross section than said first hole to define an inner surface at the intersection of said first and second holes for engaging the flat rear facing surface of the clutch head when said clutch head is inserted into and clears the first hole for securing the rod and support base together.

2. An antenna according to claim 1 wherein said clutch head includes elastic fins radially projecting from said terminal element.

3. An antenna according to claim 1 wherein said first hole for receiving said terminal body is followed by a second hole with a larger diameter coaxial therewith for receiving therein said clutch head undeformed after it clears the first hole.

4. An antenna according to claim 3 wherein said terminal element includes a coaxial centering body, and said joint element having a coaxial stepped wall forming a coaxial third hole for receiving the centering seat therein.

5. An antenna according to claim 4 wherein said centering seat is coaxially aligned with said first hole, and said second hole has a larger perimeter defining a shoulder zone suitable for receiving said centering body.

6. An antenna according to claim 4 wherein said centering body and the respective centering seat are formed with mutual coupling threads.

7. An antenna according to claim 4 wherein said centering body and the respective centering seat have transverse circular conjugate keyed profiles.

8. An antenna according to claim 4 wherein said centering body and the respective centering seat have transverse conjugate keyed profiles, each one formed with two flat parallel surfaces connected by curved profiles.

9. An antenna according to claim 4 wherein said centering body and the respective centering seat have quadrangular conjugate keyed profiles.

10. An antenna according to claim 3 wherein said terminal element is formed coaxially with the end of a centering body located on one of said rod and said joint element, said centering body being received in a respective centering seat formed in one of said rod and said joint element.

11. An antenna according to claim 3 wherein said terminal body and the respective first hole have transverse circular conjugate keyed profiles.

12. An antenna according to claim 3 wherein said terminal body and the respective first hole have transverse conjugate keyed profiles formed of two flat parallel surfaces connected by curved profiles.

13. An antenna according to claim 3 wherein said terminal body and the respective first hole have quadrangular conjugable keyed transverse profiles.

14. An antenna according to claim 1 wherein said inner surface is suitable for engaging said flat rear facing surface of said clutch head in order to prevent separation of the rod and base after coupling.

15. An antenna according to claim 1 wherein said slanting surface of said clutch head is made by at least one curved surface having a truncated conical profile.

16. An antenna according to claim 15 wherein said slanting surface of said clutch head is made by flat surfaces.

17. An antenna according to claim 1 wherein said joint element is an articulating connection for allowing the rod to be positioned at selectable orientations.

18. An antenna support comprising;

a rod;

a supporting base;

an articulating joint connecting the rod to the supporting base, said articulated joint including a first articulation element and first connecting means rigidly connecting the first articulation element to the supporting base, and a second articulating element and second connecting means for connecting said rod to said second articulation element, said first and second articulation elements being rotatable with respect to each other permitting selectable orientation of the rod with respect to the base, each including contacting means movable with respect to each other for fixedly securing the rod in a selected orientation by reciprocal interference therebetween, and means engaging at least one of said connecting means reciprocally engaging the first and second articulation elements together; and wherein the first and second articulation elements include means associated therewith for unidirectionally connecting the rod to the base.

19. The antenna support according to claim 18 wherein the first articulation element comprises a body formed of conductive material including a pair of coaxial rings having inner walls and being spaced apart by a selected distance along an axis transverse to the first connecting means;

the second articulation element comprises a cylindrical annular reel being formed of insulating material, and a conductive body sleeved within the reel, said reel including a seat for receiving the conducting body therein, the ends of which axially protruding beyond the reel and being sleeved within the coaxial rings of said first articulation element, said insulating reel being rotatable within the rings; and means for threadably connecting the rod with the conductive body for drawing the conductive body against the rings to effect said interference therebetween.

20. The antenna support according to claim 19 wherein the contacting means comprises complementary protruding teeth on the respective inner and outer surfaces of the coaxial rings and the conductive body.

21. The antenna support according to claim 19 wherein the conducting member has a threaded through hole formed therein, the rod comprises an elongated member having a tapered distal end, and unthreaded portion and a threaded portion engaging the corresponding threaded portion of the conductive member.

22. The antenna support of claim 19 wherein the reel is formed with a diametric web and a diametric hole for receiving the rod in alignment with the threaded opening of the conductive member and a diametric slot for receiving a corresponding portion of the conductive member therein.

* * * * *